July 17, 1951 M. S. CORRINGTON 2,561,059

SIGNAL AMPLITUDE CONTROLLING TRANSFORMER LOADING CIRCUIT

Filed Feb. 27, 1947 2 Sheets-Sheet 1

INVENTOR.
MURLAN S. CORRINGTON
BY H. S. Grover
ATTORNEY

July 17, 1951 M. S. CORRINGTON 2,561,059

SIGNAL AMPLITUDE CONTROLLING TRANSFORMER LOADING CIRCUIT

Filed Feb. 27, 1947

2 Sheets-Sheet 2

| CURVE | COIL SPACING | PER CENT AM REJECTION $f_0$ | $f_0$-100KC | $f_0$+100KC |
|---|---|---|---|---|
| a | 3/8" | 71% | 88% | 86% |
| b | 1/2" | 77% | 88% | 86% |
| c | 13/16" | 81% | 88% | 86% |

INPUT VOLTAGE TO DRIVER GRID (6SK7) = 0.27 VOLTS $f_0$ = 10.7 MC.

INVENTOR.
MURLAN S. CORRINGTON

BY H. S. Grover

ATTORNEY

Patented July 17, 1951

2,561,059

UNITED STATES PATENT OFFICE 2,561,059

SIGNAL AMPLITUDE CONTROLLING TRANSFORMER LOADING CIRCUIT

Murlan S. Corrington, Haddonfield, N. J., assignor to Radio Corporation of America, a corporation of Delaware Application February 27, 1947, Serial No. 731,193

16 Claims. (Cl. 178—44)

My present invention relates generally to a circuit which will absorb sudden variations in amplitude of an angle modulated carrier signal, and more particularly to a novel method of, and circuit arrangement for, variably loading a signal transmission transformer in a frequency modulation receiver.

When a frequency modulated (FM) carrier wave is received and amplified by a receiver, the FM detector output should be independent of variations of the amplitude of the incoming FM wave. These amplitude variations can be caused by multi-path signal transmission, by an interfering wave, by variations in carrier wave transmission, or by the selectivity of the tuned circuits of the receiver which precede the FM detector.

FM detector circuits have heretofore been provided which are inherently non-responsive to amplitude variations in the FM signal applied to the detector. However, operating conditions may be encountered in the use of an FM receiver wherein such an FM detector responds deleteriously to certain types of amplitude variations in the FM signal. For example, in the phenomenon termed multi-path signal transmission it is found that the arrival at the FM receiver antenna of FM signals of the same frequency but in different phases causes a form of amplitude variation which is quite difficult to cope with using the aforementioned known devices.

It may, therefore, be stated that it is an important object of my present invention to provide a simple diode circuit which may normally be connected across at least one of the signal transmission transformers in the network feeding the FM detector, the diode circuit functioning to reduce rapid variations in the carrier wave envelope but automatically adjusting itself to each new average level.

It is another important object of my present invention to provide a novel method of variably loading a signal transmission transformer of an angle modulated carrier wave receiver, with the result that a substantial reduction in the amount of amplitude modulation on an incoming carrier wave may be secured.

An additional object of my present invention is to provide an FM receiver of the superheterodyne type which may have one or more of its intermediate frequency (I. F.) transformers loaded by means of a device having unidirectional conductivity, the device functioning to load at least one of the windings of the transformer, and concurrently varying the degree of coupling between the transformer windings, as the amplitude of the carrier wave changes, in such a way that any amplitude modulation on the received FM carrier wave is considerably reduced.

In carrying out the specific objects of my present invention I may utilize across the secondary circuit of at least one of the I. F. transformers of an FM receiver any device having unidirectional conductivity. For example, I may employ a diode or a crystal rectifier of the germanium or selenium type. In general, any rectifier that will operate at the I. F. may be used. Where desirable, automatic volume control (AVC) may also be derived from the transformer loading device by virtue of its rectification action.

Still other objects of my invention are to improve generally the operation of the pre-demodulator network of an FM receiver, and more specifically to provide a means for removing amplitude modulation from an FM wave which is reliable in operation and can be very economically included in an FM receiver.

Still other features and objects of my invention will best be understood by reference to the following description, taken in connection with the drawings, in which I have indicated diagrammatically two circuit organizations whereby my invention may be carried into effect.

Figure 3:
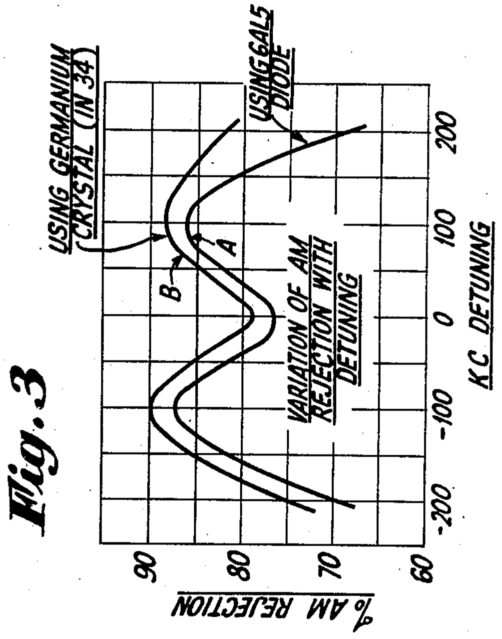
Figure 4:
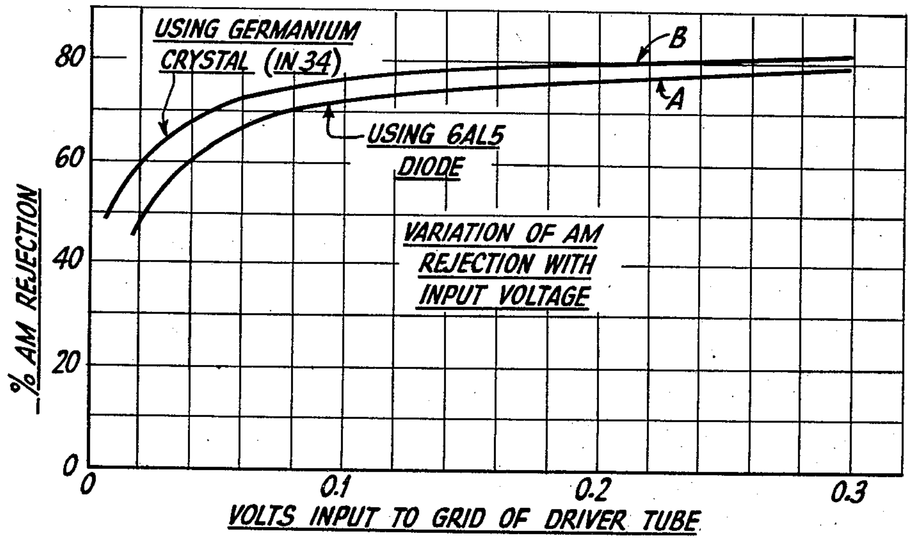
Figure 5:
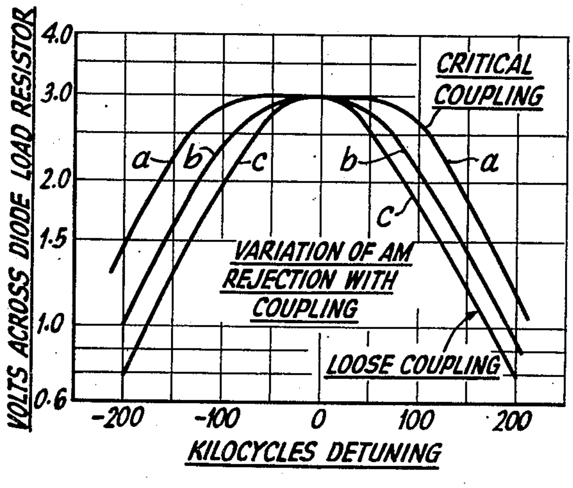

Figs. 3, 4 and 5 respectively show various operation characteristics of the transformer loading device.

Figure 1:
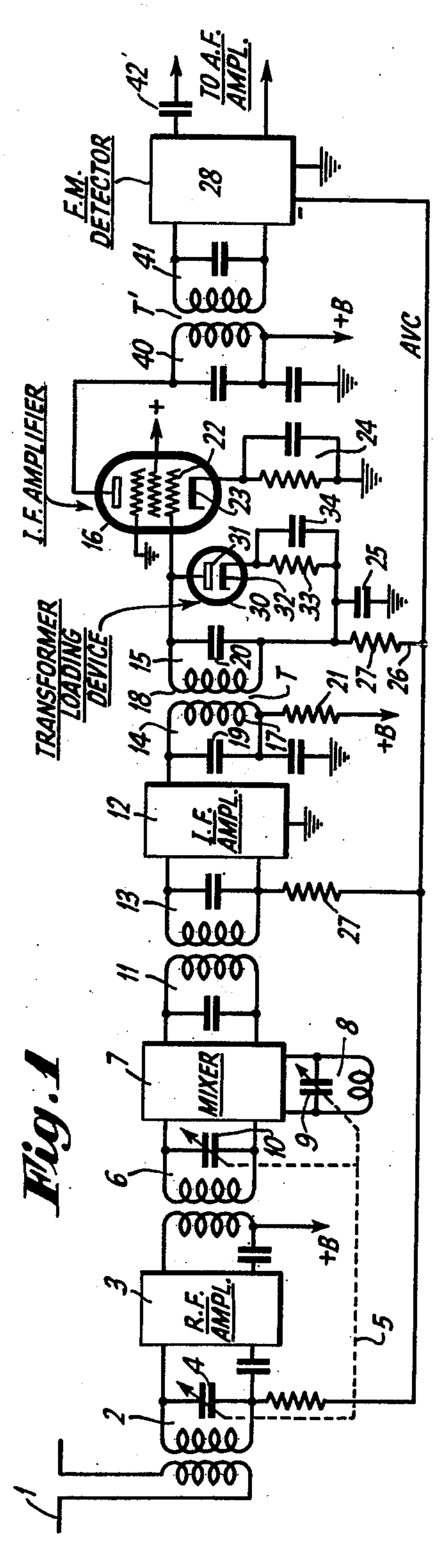
Fig. 1 shows a circuit diagram of an FM receiver, partly schematic, which employs an embodiment of my invention.

Referring now to Fig. 1, there are shown the circuit connections of only so much of an FM receiver as is necessary to a proper understanding of the present invention. The remainder of the system is schematically represented, since those skilled in the art of radio communication are fully aware of the apparatus required. It is well known that in the present FM broadcast band the superheterodyne type of receiver is widely employed. My invention is not restricted to any particular band of FM reception, nor to frequency modulation of the carrier waves. I have employed the generic term "angle modulated" herein thereby to cover both frequency and phase modulation, as well as hybrid modulations possessing characteristics common to both.

The present assigned channel width in the FM broadcast band for each FM station is 200 kilocycles (kc.). It is to be understood that the present invention is in no way restricted to any channel width for a desired FM station. Assuming for the purpose of specific illustration that the receiver shown in Fig. 1 is constructed to receive FM stations in the present assigned FM band of 88–108 mc., the FM waves are collected by any desired type of signal collector device. For example, the dipole 1 is coupled to the tunable signal selector input circuit 2 of a radio frequency amplifier 3. The selector circuit 2 is provided with a tuning reactance which may be a variable condenser 4, and the station selector device 5 may be of any suitable construction. The selector device 5 is arranged to vary the capacitance of condenser 4 to a value such as to tune the circuit 2 to the mid-band or center frequency of a desired FM station. The amplified radio frequency signal energy, after proper selection, may be selectively amplified in one or more additional stages of radio frequency amplification prior to impression of the FM waves upon the tunable input circuit 6 of the first detector or mixer stage 7.

As is well known, the mixer 7 is provided with a local oscillator network which may utilize electrodes other than those of the mixer tube in producing oscillations or may be combined therewith. The tank circuit 8 of the local oscillator network is tunable by variable condenser 9 over a range of local oscillator frequencies which differ from frequencies of the FM signal frequency range by the constant value of the I. F., and the latter may have a value, for example, of 10.7 mc. The station selector device 5 concurrently varies the capacitance of each of variable condensers 4, 10 and 9 so that there is produced in the resonant output circuit 11 of the mixer 7 intermediate frequency signal energy whose mid-band or center frequency has the I. F. value of 10.7 mc. The I. F. energy produced at output circuit 11 may be amplified by an I. F. amplifier network 12 which may include one or more I. F. amplifier stages. Numerals 13 and 14 indicate respectively the input and output circuits of amplifier network 12, while numeral 15 indicates the resonant input circuit of the following I. F. amplifier tube 16.

The amplifier tube 16 is operated at full gain as an I. F. amplifier tube, and does not operate to cut off the peak of each half of a wave, as do the well known current limiters. In other words, it transfers the I. F. signal energy at the 10.7 mc. value from transformer T to the following I. F. transformer T′, and the transfer is accomplished at the normal gain of the pentode amplifier tube 16. Each of resonant circuits 11, 13, 14 and 15 is tuned to the operating I. F. value, and, of course, each interstage coupling transformer transmits a band of FM signals having a pass band of approximately 200 kc.

The transformer T has its primary and secondary windings 17 and 18 respectively each shunted by its respective tuning condenser. Thus, tuning condenser 19 is connected in parallel across primary winding 17 while tuning condenser 20 shunts secondary winding 18. The high potential side of the primary circuit 14 is connected to the plate of the I. F. amplifier of network 12, while the low potential side of circuit 14 is by-passed to ground for I. F. currents by condenser 20. It is to be understood that the cathode circuit of the I. F. amplifier tube to which circuit 14 is connected returns to ground. The lower end of primary winding 17 is connected to a suitable point of positive voltage +B through the plate circuit resistor 21.

The secondary winding 18 has its upper end connected directly to the signal input electrode 22 of amplifier tube 16. It is to be understood that amplifier tube 16 need not be of the pentode type, but may be of any suitable and well known type. The cathode 23 of tube 16 is connected to ground through the usual current biasing network 24, and the low potential side of secondary circuit 15 is returned to ground for I. F. currents by condenser 25. The lower end of secondary winding 18 is returned to ground for direct current voltage through the AVC circuit 26.

The AVC circuit may be of any suitable and known construction, and is shown connecting through suitable filter resistors 27 to the low potential sides of tuned circuits 2, 13 and 15. Of course, at the source of AVC voltage there will be a return connection to ground through the usual load resistor of the AVC rectifier. In the present case I have shown the FM detector 28 as supplying AVC voltage, in addition to the audio signal output. Those skilled in the art of radio communication are well acquainted with the various detector arrangements used in FM receivers which are capable of supplying a negative direct current voltage whose magnitude is a direct function of the carrier amplitude.

In shunt across the secondary circuit 15 there is provided a circuit including a device of unidirectional conductivity. This device is specifically represented in Fig. 1 as a diode 30 whose anode 31 is connected to the grid 22, while the cathode 32 is connected to the lower end of secondary winding 18 through a resistor 33. The resistor 33 is shunted by condenser 34. The shunt circuit consisting of device 30 and its associated resistor 33 and condenser 34 provides a transformer loading device which functions to produce the desirable characteristics of my present invention.

Before discussing the specific characteristics of this transformer loading circuit, it is pointed out that the amplified I. F. signals developed in the primary circuit 40 of transformer T′ are applied to the FM detector 28 whose input circuit 41 is tuned to the same I. F. value as the primary circuit 40. The demodulated output of detector 28 may be applied to the input terminals of any suitable audio frequency amplifier, the condenser 42 denoting the audio signal path to the following audio amplifier. The construction of such an audio amplifier and its ultimate reproducer is well known to those skilled in the art.

The FM detector circuit itself may be a balanced discriminator-rectifier circuit of the type disclosed and claimed by S. W. Seeley in his United States Patent No. 2,121,103, granted June 2, 1938. Although in an accurately-tuned FM receiver, an FM detector of that type tends to balance out amplitude variations in received FM signals, it is not considered immune to such variations under usual receiving conditions. My transformer loading circuit will be of substantial advantage in a receiver including such an FM detector. Even where the FM detector is of a type generally immune in operation to amplitude variations, e. g., the detector shown by S. W. Seeley in application Serial No. 614,956, filed September 7, 1945, now Patent No. 2,497,841 issued February 14, 1950 (RCA 24, 180) known as a "ratio detector," the present invention provides advantages where the special reception difficulties are encountered as explained heretofore. The detector 28 may be either of these detectors.

As will be seen in Fig. 1, the I. F. amplifier tube 16 has its input circuit 15 loaded by a diode and its bypassed load resistor. The transformer T, designed for operation at 10.7 mc., has a "Q" of each of its primary and secondary circuits for the unloaded transformer of approximately 200. While it is not considered necessary to limit the invention to specific circuit constants for the network between amplifiers 12 and 16, it is pointed out that resistor 33 should preferably have a value of between 15,000 and 30,000 ohms, while condenser 34 should have a value of about 5 or 10 microfarads (mfd.). The time constant for the network 33—34 for the values given will be about 0.1 or 0.2 second.

From a general viewpoint the diode loading circuit functions to absorb sudden variations in amplitude of the FM signal. It accomplishes this function by varying the "Q" of the secondary circuit 15, and hence the degree of coupling between primary circuit 14 and secondary circuit 15, as the amplitude of the carrier wave changes, so that the amplitude modulation on the FM signal wave applied to grid 22 is considerably reduced.

The following qualitative explanation as to how the diode loading circuit performs is offered. Consider the case where the FM carrier wave increases rapidly in amplitude. The diode 30 will then take a larger amount of current than normally, thereby increasing the loading on the secondary winding 18. The secondary "Q" and the gain of the amplifier drop sharply during this time and tend to maintain the carrier wave at its original level. If the FM carrier wave happens to decrease rapidly in amplitude, the capacitor 34, which is preferably electrolytic, tends to bias the diode off, thereby unloading the secondary and raising the "Q" thereof. The increased gain tends to maintain the carrier wave at its original level as before. The time constant of the diode loading circuit is chosen such that the circuit 33—34 responds only to slow changes of the carrier amplitude. If the average carrier level changes, the electrolytic capacitor 34, which is across the diode load resistor, charges up to a new equilibrium condition, and the diode circuit thus maintains its amplitude modulation-rejecting characteristics.

The action of the diode circuit may be considered from a somewhat different viewpoint. As long as the amplitude of the FM wave at primary circuit 14 is not changing, in other words when there is no amplitude modulation on the wave, then a steady average current flows through the diode 30. As pointed out above, the diode load circuit 33—34 is responsive to slow variations of amplitude, where the time element is of the order say of 5 cycles. It is non-responsive to rapid variations, that is variations which are greater than the reciprocal of the time constant. If an incoming FM signal temporarily increases in amplitude, then the voltage across condenser 34 remains constant due to the relatively long time constant value. The signal peak exceeds the negative bias due to condenser 34, and the diode 30 is conductive and draws current for the duration of the entire peak. Therefore, there is an increase in damping across the secondary circuit 15 and the "Q" of the circuit goes down. If the FM signal decreases in amplitude, then the diode 30 draws less than the average current. The peaks of signal then do not override the voltage developed by the capacitor 34. The damping of secondary circuit 15 then decreases, and the "Q" of the circuit rises. It must be remembered that increasing the "Q" of the secondary circuit 15 is equivalent to increasing the degree of coupling (QK) between circuits 14 and 15.

A diode loading circuit may be connected across one or more of the signal transmission transformers. My invention is not limited to variable loading of a transformer, since the loading circuit may well be used across any other type of signal coupling device. AVC voltage need not be applied to tube 16.

It is desirable to utilize AVC voltage so as to prevent relatively slow carrier amplitude variations from affecting the FM detector. Advantage can be taken of the fact that the loading device is a rectifier by having it develop the AVC voltage for the receiver. I have shown this modification in Fig. 2, wherein the device 30′ is an AVC rectifier in addition to being a transformer loading device. The anode 31′ is connected to the high potential side of secondary circuit 15, while the cathode 32′ is connected to ground. The load resistor 33′ is connected between the low potential side of input circuit 15 and the grounded cathode 32′, while the shunt electrolytic capacitor 34′ is connected in parallel with load resistor 33′. The AVC connection 26′ is taken from the ungrounded end of resistor 33′. The anode 31′ of rectifier 30′ will in this case be connected through a direct current voltage blocking condenser 50 to the I. F. amplifier signal grid 22, the grid leak resistor 51 returning the grid (not shown) to ground.

Figure 2:
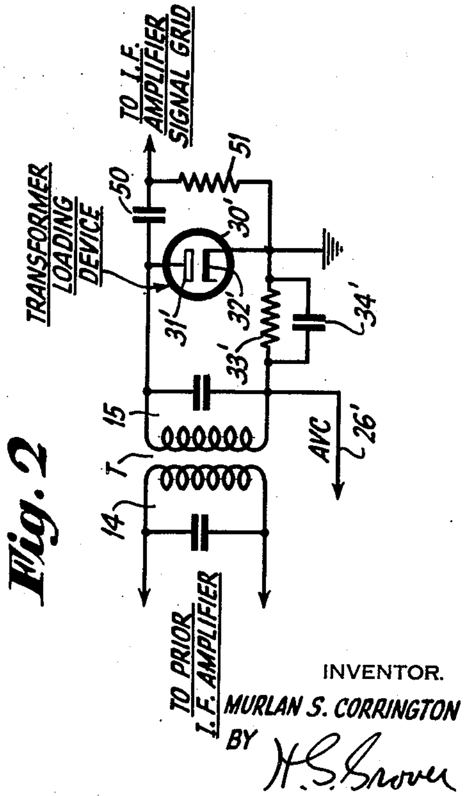
Fig. 2 shows a modified embodiment of the invention.

The circuit shown in Fig. 2 is equivalent electrically to that shown in Fig. 1, except that the cathode end of the load resistor is now grounded. In other words, the diode 30′ in Fig. 2 functions variably to load the transformer T, and at the same time provides rectified direct current voltage for AVC purposes. Since the time constant of network 33′—34′ is relatively long, diode 30′ is able to rectify the relatively slow carrier variations of the FM signal, while at the same time controlling the loading of transformer T so as to prevent relatively rapid amplitude variations in the FM signal from being passed on to the FM detector. The device 30′ of Fig. 2 may be a germanium crystal rectifier. For example, the loading device may be a diode of the 6AL5 type or a crystal rectifier of the 1N34 type. The device 30′ may be a selenium rectifier, if desired. Any rectifier that will operate at the I. F. may be used. In Fig. 1 the diode 30 could be reversed if desired, so long as AVC voltage is not taken from its resistor.

Reference is now made to the curves shown in Figs. 3 and 4. These curves represent characteristics of the loading circuit shown in Fig. 1 for either the diode type 6AL5 or the germanium crystal rectifier 1N34. The diode 30 was used with a 10 mfd. electrolytic bypass capacitor 34 across a 20,000 ohm load resistor 33. The curves for the germanium crystal (1N34) were taken with a load resistor 33 of 30,000 ohms. In Fig. 3 "per cent AM rejection" is plotted as ordinates against "kilocycles detuning" as abscissae. In Fig. 4 "per cent AM rejection" is plotted against "volts input to grid of driver tube." In both cases these particular curves were secured using a 10.7 mc. carrier wave applied to driver 12, the wave was amplitude modulated (AM) 30% at 400 cycles per second.

Fig. 3 shows the variation of AM rejection (equal to percent reduction in percent modulation) across the band when transformer T is slightly undercoupled. Curves A and B respectively are for the 6AL5 diode and 1N34 germanium crystal rectifier. The input voltage to the I. F. driver 12 was adjusted to 0.27 volt for the 6AL5 and 0.35 volt for the 1N34 to obtain 3 volts across their respective load resistors of 20,000 and 30,000 ohms at the center frequency. The AM rejection across the band varies in the same way for other input levels to the signal grid of driver 12. The selectivity curve corresponding to curves A and B of Fig. 3 is shown in Fig. 5 (curve *b*).

The curves of Fig. 4 show the variation of AM rejection with input voltage to the signal grid of driver tube 12. The conditions of coupling are the same as for the curves A and B of Fig. 3. The AM rejection is shown for the center frequency only. At 100 kc. from the center frequency the AM rejection is approximately 8–10% greater than at the center frequency for various levels of input voltage. Since the germanium crystal has negligible contact voltage it is superior to the 6AL5 diode in rejecting AM for the low levels of input voltage.

The curves of Fig. 5 denote "volts across diode load resistor" plotted against "kilocycles detuning." The respective curves *a*, *b* and *c* show the selectivity of transformer T for various degrees of coupling between windings 17 and 18. The mid-band reduction in amplitude modulation increases as the coupling is reduced, and is greatest when the transformer is undercoupled. At 100 kc. from the center frequency the reduction is approximately constant. The table of Fig. 5 is self-explanatory.

The following conclusions may be drawn from the curves shown in Figs. 3, 4 and 5. The rejection of amplitude modulation varies with the degree of coupling (QK) and increases with a decrease in coupling. The coupling can be varied by changing the diode load resistor, or by changing the primary and secondary coil spacing ($k$). The amplitude modulation is reduced more satisfactorily when the transformer is undercoupled than when it is overcoupled. The wave form of the envelope of the output carrier wave remains sinusoidal for moderate percentages of amplitude modulation (50–60%), when the transformer is undercoupled. As the coupling is increased beyond critical the envelope becomes cusped with broad peaks and sharp holes. This, also, happens when the percentage modulation is increased beyond 50 to 60 percent. When the circuit is operating properly, the carrier wave tends to maintain its unmodulated level e. g. the hollows are filled and the peaks are depressed, because of the variable loading action on the secondary of the transformer.

The mid-frequency rejection is less than the rejection at points somewhat off the mid-frequency. By adjustment of the coupling the separation of the two points of maximum amplitude modulation rejection can be varied. The mid-frequency rejection increases as the band width decreases, while the rejection at the edges of the band remains nearly constant. The amplitude modulation reduction is nearly independent of input voltage when the input voltage to the grid of the tube (6SK7) driving the transformer exceeds approximately 0.04 volt (using a 6AL5 diode or a 1N34 germanium crystal rectifier).

The Q's of the primary and secondary of the unloaded transformer should be made as high as possible ($Q$=200) for best performance of the rejecting circuit. The secondary is loaded by the diode load resistor such that its Q falls to about 50 ($R$=20,000 ohms). With this value of R and an electrolytic bypass capacitor of 10 mfd., the time constant of the loading circuit is 0.2 sec. It was found that an electrolytic bypass capacitor of 5 mfd., also, gives good performance in the circuit. A germanium crystal rectifier will reject amplitude modulation with approximately the same efficiency as a 6AL5 diode. However, since it has a higher rectification efficiency than the diode a larger load resistor is required to give the same loading on the circuit, the input resistance to a diode with a properly bypassed load resistance (R) being $$\frac{R}{2n}$$

where $n$ is the rectification efficiency.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In combination, a source of angle modulated carrier wave energy, a wave utilization circuit, transformer coupling means between the source and utilization circuit for transmitting the wave energy, and the improvement comprising a loading path in shunt with said transformer coupling means, said path including a device of unidirectional conductivity and a time constant network chosen to have a time constant that is long compared to a cycle of the modulation frequency such that said loading path responds only to slow changes of the carrier wave amplitude and prevents relative fast amplitude variations from affecting said utilization circuit, said loading path having a resistive impedance that is smaller than the impedance of said transformer coupling means at the frequency of said carrier wave, said resistive impedance having such a value that the "Q" of said transformer coupling means is normally reduced to less than one half of its "Q" without said loading path.

2. In a combination as defined in claim 1; said utilization circuit being an amplifier of said energy, said loading path device consisting of a rectifier, and said time constant network being a resistor-capacitor network.

3. In a combination as defined in claim 2; said transformer coupling means being a transformer having its secondary winding shunted by said loading path rectifier.

4. In a frequency modulation receiver of the superheterodyne type, an intermediate frequency amplifier channel including an intermediate frequency transformer, a transformer loading circuit connected in parallel across the secondary of the transformer, said loading circuit absorbing sudden variations in the amplitude of the frequency modulated carrier wave at intermediate frequency, said loading circuit comprising a diode, a load resistor in the space current path of the diode, and a condenser connected across the resistor, said load resistor having a resistance that is smaller than the impedance of said transformer secondary at said intermediate frequency, the "Q" of said transformer secondary being normally reduced by said load resistor to a value less than one half of its value without said transformer loading circuit, the transformer primary being not loaded, the relative magnitudes of resistor and condenser being chosen so as to impart a time constant to the loading circuit that is long compared to a cycle of the modulation frequency.

5. In combination, a source of frequency modulated carrier wave energy, a wave utilization circuit, transformer coupling means between the source and utilization circuit for transmitting the wave energy, a loading path in shunt with the transformer coupling means, said path including a device of unidirectional conductivity, provided with a time constant network having a time constant that is long compared to a cycle of the modulation frequency so that the loading path responds only to slow changes of the carrier wave amplitude and prevents relative fast amplitude variations from affecting said utilization circuit, said network having a resistive impedance that is smaller than the impedance of said transformer coupling means at the carrier wave frequency, said resistive impedance having such a value that the "Q" of said transformer coupling means is normally reduced to less than one half of its "Q" without said loading path.

6. In a combination as defined in claim 5; said utilization circuit being an amplifier of said energy, said device consisting of a diode rectifier.

7. In a combination as defined in claim 5; said device being a germanium crystal rectifier, and said transformer coupling means having its secondary winding shunted by the rectifier.

8. In a frequency modulation receiver of the superheterodyne type, an intermediate frequency amplifier channel including an intermediate frequency coupling transformer; the improvement comprising a transformer loading circuit connected in parallel across the secondary winding of the transformer, the primary winding of the transformer being not loaded, said loading circuit comprising a diode, a load resistor in the space current path of the diode, a condenser connected across the resistor, said loading circuit having a resistive impedance that is small compared to the impedance of said coupling transformer at the carrier wave frequency so that the "Q" of the transformer secondary is normally reduced to a value of less than one half its value without said loading circuit, the relative magnitudes of resistor and condenser being chosen so as to impart a long time constant to the loading circuit that is long compared to a cycle of the modulation frequency, and a circuit connection to derive gain control voltage from the resistor.

9. In a frequency modulation receiver, a transformer coupling a signal amplifier to another signal amplifier, a loading circuit being provided in parallel across the secondary of the transformer, said loading circuit having a time constant that is long compared to a cycle of the modulation frequency, said loading circuit absorbing sudden variation in either direction in the amplitude of the frequency modulated signals, said loading circuit having a resistive impedance that is smaller than the impedance of said transformer secondary at its resonant frequency, thereby to reduce normally the secondary winding "Q" to less than one-half of its original value and to reduce the degree of coupling of the transformer windings, and to vary said "Q" and said degree of coupling as the amplitude of the carrier changes, in such a way that any amplitude modulation on the signal carrier is considerably reduced.

10. A system for removing the undesired amplitude modulation of a frequency-modulated wave signal comprising: a frequency-modulation wave-signal translating channel including a parallel-resonant circuit substantially resonant at the center frequency of the pass band of said channel and having much less than critical damping; a rectifier device and a condenser device connected in series in a circuit coupled effectively in parallel with said resonant circuit and having in the conductive direction at said frequency an impedance much less than the impedance of said resonant circuit; and a resistor connected in parallel with one of said devices and having a value of resistance much greater than said conductive-direction impedance to effect peak rectification, yet sufficiently less than said resonant-circuit impedance to cause by loading said rectifier device an average conductance providing the major part of the total damping of said resonant circuit but much less than critical damping thereof; said condenser device having a value to provide with said resistor a time constant both greater than the greatest radian period of the amplitude modulation to be removed from a wave signal translated by said channel and greater than the greatest radian period of the frequency modulation of the translated wave signal, whereby the bias potential developed across said condenser device by rectification varies with the average amplitude of said translated wave signal to vary the amplitude level about which amplitude modulation is removed.

11. A system for removing the undesired amplitude modulation of a frequency-modulated wave signal comprising: a frequency-modulation wave-signal translating channel having a controllable gain characteristic and including a parallel-resonant circuit substantially resonant at the center frequency of the pass band of said channel and having much less than critical damping; a rectifier device and a condenser device connected in series in a circuit coupled effectively in parallel with said resonant circuit and having in the conductive direction at said frequency an impedance much less than the impedance of said resonant circuit; a resistor connected in parallel with one of said devices and having a value of resistance much greater than said conductive-direction impedance to effect peak rectification, yet sufficiently less than said resonant-circuit impedance to cause by loading said rectifier device an average conductance providing the major part of the total damping of said resonant circuit but much less than critical damping thereof; said condenser device having a value to provide with said resistor a time constant both greater than the greatest radian period of the amplitude modulation to be removed from a wave signal translated by said channel and greater than the greatest radian period of the frequency modulation of the translated wave signal, whereby the bias potential developed across said condenser device by rectification varies with the average amplitude of said translated wave signal to vary the amplitude level about which amplitude modulation is removed, and means for utilizing the bias potential developed across said condenser device to control the gain of said channel to reduce the range of average amplitude variations of said translated wave signal.

12. A system for removing the undesired amplitude modulation of a frequency-modulated wave signal comprising: a frequency-modulation wave-signal translating channel including a parallel-resonant circuit substantially resonant at the center frequency of the pass band of said channel and having much less than critical damping; a rectifier device and a condenser device connected in series in a circuit coupled effectively in parallel with said resonant circuit and having in the conductive direction at said frequency an impedance much less than the impedance of said resonant circuit; and a resistor connected in parallel with one of said devices and having a value of resistance much greater than said conductive-direction impedance to effect peak rectification, yet sufficiently less than said resonant-circuit impedance to cause by loading said rectifier device an average conductance providing the major part of the total damping of said resonant circuit but much less than critical damping thereof; said condenser device having a value to provide with said resistor a time constant greater than the greatest radian period of the amplitude modulation to be removed from a wave signal translated by said channel, whereby the bias potential developed across said condenser device by rectification varies with the average amplitude of said translated wave signal to vary the amplitude level about which amplitude modulation is removed.

13. A wave-signal amplitude-limiting system comprising: a wave-signal translating channel including a parallel-resonant circuit substantially resonant at the center frequency of the pass band of said channel and having much less than critical damping; a low-impedance rectifier device and a condenser device connected in series in a circuit coupled effectively in parallel with said resonant circuit and having in the conductive direction at said frequency an impedance much less than the impedance of said resonant circuit; and a resistor connected in parallel with one of said devices and having a value of resistance much greater than said conductive-direction impedance to effect peak rectification, yet sufficiently less than said resonant-circuit impedance to cause by loading said rectifier device an average conductance providing the major part of the total damping of said resonant circuit but much less than critical damping thereof; said condenser device having a value to provide with said resistor a time constant greater than the greatest radian period of the amplitude modulation to be removed from a wave signal translated by said channel, whereby the bias potential developed across said condenser device by rectification varies with the average amplitude of said translated wave signal to vary the limiting level of said system in accordance therewith yet has a substantially constant value for said amplitude modulation to effect amplitude limiting by said system at said level.

14. A wave-signal amplitude-limiting system comprising: a wave-signal translating channel including a parallel-resonant circuit substantially resonant at the center frequency of the pass band of said channel and having much less than critical damping; a rectifier device having a conductive impedance not greater than several hundred ohms and a condenser device connected in series in a circuit coupled effectively in parallel with said resonant circuit and having in the conductive direction at said frequency an impedance much less than the impedance of said resonant circuit; and a resistor connected in parallel with one of said devices and having a value of resistance much greater than said conductive-direction impedance to effect peak rectification, yet sufficiently less than said resonant-circuit impedance to cause by loading said rectifier device an average conductance providing the major part of the total damping of said resonant circuit but much less than critical damping thereof; said condenser device having a value to provide with said resistor a time constant greater than the greatest radian period of the amplitude modulation to be removed from a wave signal translated by said channel, whereby the bias potential developed across said condenser device by rectification varies with the average amplitude of said translated wave signal to vary the limiting level of said system in accordance therewith yet has a substantially constant value of said amplitude modulation to effect amplitude limiting by said system at said level.

15. A wave-signal amplitude-limiting system comprising: a wave-signal translating channel including a parallel-resonant circuit substantially resonant at the center frequency of the pass band of said channel and having much less than critical damping; a crystal diode rectifier device and a condenser device connected in series in a circuit coupled effectively in parallel with said resonant circuit and having in the conductive direction at said frequency an impedance much less than the impedance of said resonant circuit; and a resistor connected in parallel with one of said devices and having a value of resistance much greater than said conductive-direction impedance to effect peak rectification, yet sufficiently less than said resonant-circuit impedance to cause by loading said rectifier device an average conductance providing the major part of the total damping of said resonant circuit but much less than critical damping thereof; said condenser device having a value to provide with said resistor a time constant greater than the greatest radian period of the amplitude modulation to be removed from a wave signal translated by said channel, whereby the bias potential developed across said condenser device by rectification varies with the average amplitude of said translated wave signal to vary the limiting level of said system in accordance therewith yet has a substantially constant value for said amplitude modulation to effect amplitude limiting by said system at said level.

16. A wave-signal amplitude-limiting system comprising: a wave-signal translating channel having a controllable gain characteristic and including a parallel-resont circuit substantially resonant at the center frequency of the pass band of said channel and having much less than critical damping; a rectifier device and a condenser device connected in series in a circuit coupled effectively in parallel with said resonant circuit and having in the conductive direction at said frequency an impedance much less than the impedance of said resonant circuit; a resistor connected in parallel with one of said devices and having a value of resistance much greater than said conductive-direction impedance to effect peak rectification, yet sufficiently less than said resonant-circuit impedance to cause by loading said rectifier device an average conductance providing the major part of the total damping of said resonant circuit but much less than critical damping thereof; said condenser device having a value to provide with said resistor a time constant greater than the greatest radian period of the amplitude modulation to be removed from a wave signal translated by said channel, whereby the bias potential developed across said condenser device by rectification varies with the average amplitude of said translated wave signal to vary the limiting level of said system in accordance therewith yet has a substantially constant value for said amplitude modulation to effect amplitude limiting by said system at said level, and means for utilizing the bias potential developed across said condenser device to control the gain of said channel at a point preceding said parallel-resonant cricuit to reduce the range of average amplitude variations of the wave signal applied to said parallel-resonant circuit.

MURLAN S. CORRINGTON.

REFERENCES CITED

The following references are of record in the file of this patent:

UNITED STATES PATENTS

| Number | Name | Date |
|---|---|---|
| 2,224,794 | Montgomery | Dec. 10, 1940 |
| 2,248,793 | Terry | July 8, 1941 |
| 2,255,668 | Koch | Sept. 9, 1941 |
| 2,273,097 | Foster et al. | Feb. 17, 1942 |
| 2,273,934 | Campbell | Feb. 24, 1942 |
| 2,340,429 | Rankin | Feb. 1, 1944 |
| 2,351,240 | Trevor | June 13, 1944 |
| 2,379,688 | Crosby | July 3, 1945 |

OTHER REFERENCES

Sylvania Electric Company Advertisement QST for December 1946, page 4.

Cornelius: "Germanium Crystal Diodes," Electronics, February 1946, pages 118 to 123.